July 14, 1959

R. H. HALLMAN 2,894,458

POWER TRANSMISSION

Filed March 1, 1954

INVENTOR.
RUSSELL H. HALLMAN
BY
Ralph L. Tweedale
ATTORNEY

United States Patent Office 2,894,458
Patented July 14, 1959

2,894,458

POWER TRANSMISSION

Russell H. Hallman, Royal Oak, Mich., assignor to Vickers Incorporated, Detroit, Mich., a corporation of Michigan Application March 1, 1954, Serial No. 413,123

3 Claims. (Cl. 103—120)

This invention relates to power transmissions, and is particularly applicable to those of the type comprising two or more fluid pressure energy translating devices, one of which may function as a pump and another as a fluid motor.

More particularly, the invention relates to pumping structure of the variable displacement type for use in such a transmission. Where the pumping mechanism of a fluid power transmission is driven by a variable speed prime mover, such as the engine of a motor vehicle, the volumetric potential of the pump at higher speeds normally exceeds by a wide margin the fluid requirements of the system. The problem of high speed over-supply of fluid has been approached by two quite different methods. The first of these is to provide a spill-over type flow control valve which, in the higher speed ranges, will divert the fluid pumped in excessive system requirements back to the reservoir, or inlet zones of the pumping mechanism. A serious disadvantage of this first system is that considerable power loss results, especially when the system is under high operating pressure, by reason of the discharge of a large part of the pump output directly from that operating pressure to reservoir pressure, while doing no useful work.

The second approach to the problem of oversupply during high speeds of a variable speed prime mover is to reduce the volumetric displacement of the pumping mechanism as its output tends to exceed a predetermined maximum. The advantage of this type of system resides in the fact that substantially all of the fluid delivered by the pumping mechanism is utilized for doing useful work.

Despite the major advantages of the variable displacement pump for such a system, the spill-over flow control circuit has met with very wide acceptance due to its simplicity and low initial cost. It is therefore an object of this invention to provide a flow compensated variable displacement pump which is of a simple design and capable of low cost manufacture.

A further object is to provide such a pumping mechanism in which the displacement is varied by a structure which is rugged, easily constructed, and highly efficient by reason of minimizing leakage loss.

In such a system it is imperative to have some form of overload preventive device. In conventional construction this device takes the form of a relief valve capable of handling the entire volumetric output of the pumping mechanism. Such a relief valve is of necessity large, heavy, and expensive. It is an object of this invention to provide in combination with the flow compensating mechanism a simple and low cost overload preventing arrangement.

More particularly, it is an object of this invention to provide an overload preventing system which utilizes a small capacity relief valve to limit the maximum system pressure in a system wherein the pumping mechanism has a relatively large volumetric capacity.

A further object is to provide a compact and low cost system for both flow and pressure compensating a variable displacement pumping structure, in which the flow compensating and pressure compensating portions of the system cooperate in an efficient and economical manner.

Further objects and advantages of the present invention will be apparent from the following description, reference being had to the accompanying drawing wherein a preferred form of the present invention is clearly shown.

Figure 1:
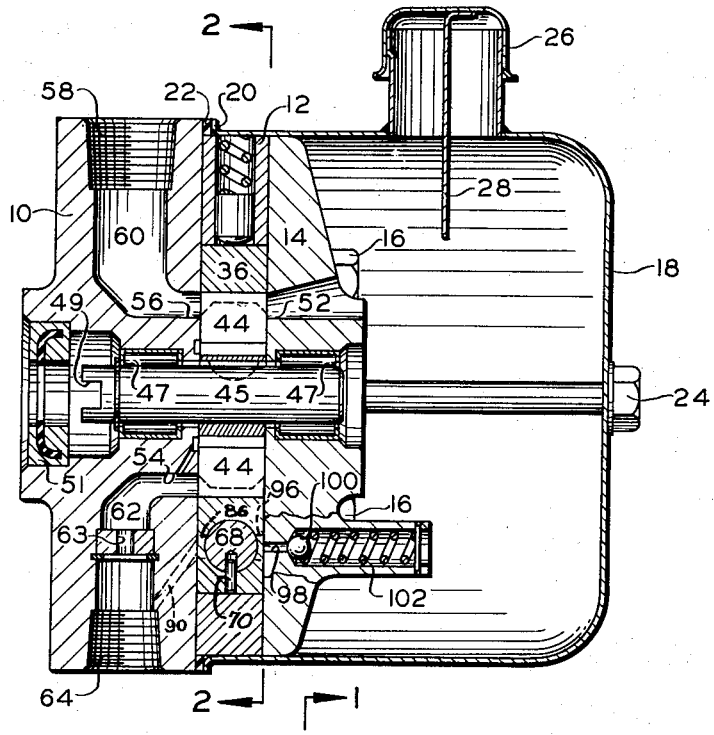
Figure 1 is a longitudinal, sectional view of pumping mechanism embodying the present invention taken on line 1—1 of Figure 2.
Figure 2:
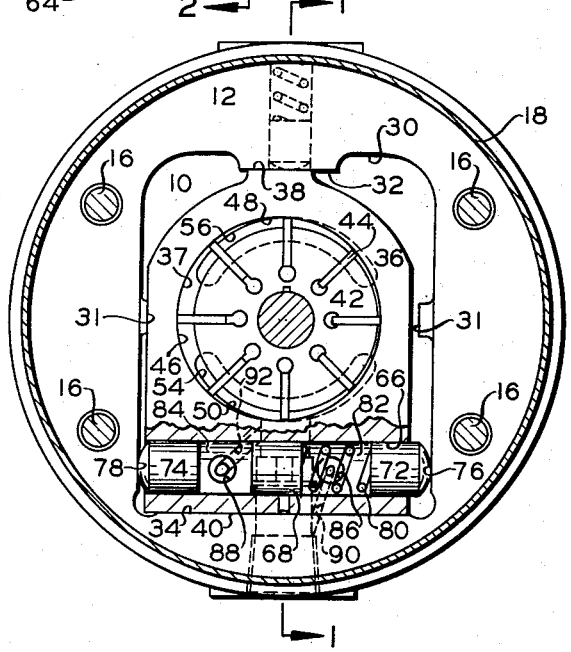
Figure 2 is a section taken on line 2—2 of Figure 1.

Referring now to Figure 1, the device comprises a body member 10, a spacer member 12, and a head 14 secured together in a sandwich relation by a plurality of bolts 16 which extend through the head 14 and the spacer member 12 to engage screw threads in the body member 10. An open end reservoir 18 slips over the head 14 and the spacer 12 and is flanged at 20 to compress a gasket 22 against the body 10. A bolt 24 extends through the closed end of reservoir 18 to engage threads in the pump head 14. The usual filler cap 26 and oil level indicator 28 are provided.

The spacer member 12 is provided with a central recess 30 having a pair of flat parallel plane faces 32 and 34 therein. A stator member 36 is positioned in the recess 30 and is provided with a pair of flat plane parallel faces 38 and 40 which engage the faces 32 and 34 to guide the stator 36 in sliding movement parallel to those faces. A pair of stops 31 engage stator 36 to limit movement thereof. The stator 36 has a cylindrical bore 37 therein. A rotor 42, having radially slidable vanes 44 therein, is positioned in the bore 37. Rotor 42 is supported on a pump shaft 45 which is rotatably mounted in bearings 47 in the pump head and body. Shaft 45 is slotted at 49 to engage the tang of a drive shaft, not shown, which is in a driving relation with a variable speed prime mover, also not shown. A conventional shaft seal 51 is provided to prevent leakage from the pump body at the point of emergence therefrom of the drive shaft.

The bore 37 and the rotor 42 define between them a working space 46 having inlet and outlet zones 48 and 50, respectively, through which pass the working spaces included between adjacent vanes. An inlet port 52 extends through the head member 14 to establish communication between the interior of the reservoir 18 and the inlet, or suction, zone 48. An outlet port 54 in the body member 10 communicates with the outlet zone 50. A return port 56 also communicates with the inlet zones 48 and is equal in arcuate extent to inlet port 52. A return connection port 58 is connected by a return passage 60 to the port 56. A delivery passage 62 extends through the body 10 to an external delivery connection port 64. Delivery passage 62 is restricted at 63 for purposes of sensing delivery rate and controlling the pump output, as hereinafter described.

It can be seen that in the illustrated position of stator 36 the quantity of fluid displaced by the pumping mechanism per revolution will be a maximum and that as the eccentricity between the pumping chamber 37 and the rotor 42 is decreased, by shifting of the stator 36, the displacement of the pumping mechanism will be reduced.

The stator 36, rotor 42, and vanes 44 have an axial thickness very slightly less than that of the spacer member 12. The tolerances between these parts are closely held so as to provide running clearance for the rotary members and sliding freedom for the stator 36, while at the same time maintaining fluid leakage to a minimum.

The stator member 36 is provided with a bore 66 which extends completely therethrough in a direction parallel to the plane faces 32 and 34 and perpendicularly offset from the drive shaft axis. A plug 68 peripherally engages the bore 66 in fluid sealing engagement and is retained in the approximate center of the bore by a pin 70 which extends inward from the face 40. A pair of plungers 72 and 74 are slidable in fluid sealing engagement with the bore 66 and extend therefrom to contact the walls of the recess 30 at 76 and 78. A spring 80 is exerted between the plunger 72 and the plug 68 to bias the stator 36 to the maximum displacement position. It can be seen that there is thus provided a pair of pressure chambers 82 and 84, the pressures in which are exerted on plug 68 to effect shifting of the stator 36 in opposite directions.

A pair of drilled passages 86 and 88 extend through the side of stator 36 adjacent body member 10 to communicate with pressure chambers 82 and 84, respectively. A pair of drilled passages 90 and 92 are coincident with holes 86 and 88, respectively, at the juncture between stator 36 and body 10. Drilled passage 90 extends to communicate with the delivery passage 62 at a point downstream of the constriction 63. The passage 92 extends to communicate with the delivery passage 62 at a point upstream from the constriction 63. Note that the holes 86 and 88 are of such a size that movement of stator 36 throughout its full range of travel will not disrupt communication between those holes and the associated drilled passages 90 and 92. Passage 90 is relatively constricted for a purpose hereinafter discussed.

A second passage 96 in the stator 36 communicates with the chamber 82. Passage 96 is proportioned similarly to the passages 86 and 88 and is in coincidence with a passage 98 and the head 14 at the juncture of the head 14 and the stator 36. Passage 98 extends through the head 14 to communicate with the interior of reservoir 18, and is controlled by a relief valve 100 which is biased to the closed position by a spring 102. When the pressure in chamber 82 exceeds a maximum determined by the load of spring 102, valve 100 will open to vent chamber 82 to the tank 18.

The above described mechanism provides a pumping unit which is both flow and pressure compensated. In operation, the device will be driven by a variable speed prime mover connected to the drive shaft 45. During low speed operation the spring 80 will be exerted against the plug 68 to bias the stator 36 to the position illustrated, in which displacement of the device is at a maximum. The maximum delivery per revolution of the pumping unit will pass through the delivery port 54, into the delivery passage 62, and through the restriction 63 to the external delivery connection port 64. At these lower speeds the pressure differential across the constriction 63, which differential also exists between the pressure chambers 82 and 84, will not be sufficient in reacting against the end areas of the plug 68 to compress the spring 80. As the speed of the pumping mechanism continues to increase, the pressure differential across the constriction 63, and hence between the chambers 82 and 84, will act on the end areas of the plug 68 to overcome the initial load of spring 80, and start displacement reduction. At all speeds above the critical one at which displacement reduction starts, the opposed pressures in chambers 82 and 84 will shift the stator 36 so as to maintain a substantially constant pressure drop through the constriction 63. Thus as the pump delivery tends to exceed a predetermined maximum the stator member 36 will be shifted to maintain a substantially constant delivery rate. The pumping mechanism is by this means flow compensated and the structure provided for this purpose by the present invention is of a simple, low cost, and compact nature.

In addition to flow compensating the pumping mechanism, the present invention provides a system for pressure compensating the pumping mechanism, which cooperates with the flow compensating structure in a manner such as to require minimum additional structure and which will operate in an efficient manner. As operating pressures in the system reach a predetermined maximum, as established by the spring 102 of the relief valve 100, the valve 100 will be lifted from its seat venting the pressure chamber 82 to the interior of the reservoir 18. As heretofore noted, the passage 90 which connects pressure chamber 82 to the delivery passage at a point downstream of the constriction 63 is a restricted one. Thus, when valve 100 operates to vent chamber 82 a pressure drop will ensue and this pressure drop in chamber 82 creates a pressure unbalance on opposite sides of the plug 68. The pressure in chamber 84 will then move the stator 36 toward a position of reduced displacement. Such an arrangement reduces power loss due to excessive pressures to a minimum, since only a small quantity of high pressure fluid must be diverted through the relief valve 100 to produce sufficient pressure drop in chamber 82 to start displacement reduction.

There is thus provided variable displacement pumping structure which is compact and capable of low cost manufacture and which is both flow compensated and pressure compensated.

While the form of embodiment of the invention as herein disclosed constitutes a preferred form, it is to be understood that other forms might be adopted, all coming within the scope of the claims which follow.

What is claimed is as follows:

1. A combined flow and pressure compensating system for rotary pumping structure having a member shiftable to vary the displacement per revolution thereof, comprising in combination: a fluid motor coupled to said member, said motor having a pair of opposed pressure responsive surface areas; flow sensing means in the outlet line for producing a pair of pressures having a differential dependent on the pump output rate; means for directly applying one of said pressures to each of said opposed surface areas to control the position of said shiftable member; and means forming a relief valve, responsive to a predetermined maximum pump discharge pressure, for varying said directly applied pressure differential irrespective of output rate to shift said member to reduce pump displacement.

2. Control means for rotary pumping structure, comprising: means forming a delivery passage leading from said pumping structure; a member shiftable to vary the displacement per revolution of said pumping structure; flow restricting means in said delivery passage; means forming a fluid motor coupled to said member and having a pair of expansible pressure chambers having walls forming areas shiftable under pressure to induce movement of said member in opposite directions; constricted passage means extending from downstream of said flow restricting means to communicate with that one of said chambers in which an increase in pressure tends to induce greater displacement; passage means extending from said delivery passage at a point upstream of said flow restricting means to communicate with the other of said chambers; and relief valve means communicating with said one chamber for venting said one chamber in response to excess pressure, whereby said pumping mechanism will be both flow and pressure compensated.

3. Control means for rotary pumping structure, comprising: means forming a delivery passage leading from said pumping structure; a member shiftable to vary the displacement per revolution of said pumping structure; resilient means biasing said member toward maximum displacement; flow restricting means in said delivery passage; means forming a fluid motor coupled to said member and having a pair of expansible pressure chambers having walls forming areas shiftable under pressure to induce movement of said member in opposite directions; constricted passage means extending from downstream of said flow restricting means to communicate with that one of said chambers in which an increase in pressure tends to induce greater displacement; passage means extending from said delivery passage at a point upstream of said flow restricting means to communicate with the other of said chambers; and relief valve means communicating with said one chamber for venting said one chamber in response to excess pressure, whereby said pumping mechanism will be both flow and pressure compensated.

References Cited in the file of this patent

UNITED STATES PATENTS

| | | |
|---|---|---|
| 2,238,061 | Kendrick | Apr. 15, 1941 |
| 2,600,632 | French | June 17, 1952 |
| 2,600,633 | French | June 17, 1952 |
| 2,698,579 | Hammond | Jan. 4, 1955 |
| 2,716,946 | Hardy | Sept. 6, 1955 |
| 2,724,335 | Eames | Nov. 22, 1955 |
| 2,733,662 | Hunter | Feb. 7, 1956 |
| 2,742,862 | Banker | Apr. 24, 1956 |
| 2,748,711 | Drude | June 5, 1956 |
| 2,752,853 | Eames | July 3, 1956 |
| 2,768,582 | Klessig et al. | Oct. 30, 1956 |
| 2,768,585 | Hardy | Oct. 30, 1956 |